(12) United States Patent
Tripathy et al.

(10) Patent No.: US 11,168,168 B2
(45) Date of Patent: Nov. 9, 2021

(54) FUNCTIONALIZED RESIN FOR TIRE APPLICATIONS

(71) Applicant: ExxonMobil Chemical Patents Inc., Baytown, TX (US)

(72) Inventors: Ranjan Tripathy, Sugar Land, TX (US); Jason A. Mann, Houston, TX (US); Edward J. Blok, Huffman, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 118 days.

(21) Appl. No.: 16/070,304

(22) PCT Filed: Mar. 8, 2017

(86) PCT No.: PCT/US2017/021256
§ 371 (c)(1),
(2) Date: Jul. 16, 2018

(87) PCT Pub. No.: WO2017/189100
PCT Pub. Date: Nov. 2, 2017

(65) Prior Publication Data
US 2019/0330401 A1  Oct. 31, 2019

Related U.S. Application Data

(60) Provisional application No. 62/329,629, filed on Apr. 29, 2016.

(30) Foreign Application Priority Data

Jun. 28, 2016 (EP) .................................... 16176535

(51) Int. Cl.
C08F 236/04 (2006.01)
C08L 9/06 (2006.01)
B60C 1/00 (2006.01)
B60C 11/00 (2006.01)

(52) U.S. Cl.
CPC ........ C08F 236/045 (2013.01); B60C 1/0016 (2013.01); B60C 11/0008 (2013.01); C08L 9/06 (2013.01); B60C 2011/0025 (2013.01); C08F 2800/20 (2013.01); C08L 2205/025 (2013.01); C08L 2205/035 (2013.01)

(58) Field of Classification Search
CPC ................ C08L 9/06; C08L 2205/025; C08L 2205/035; C08F 236/045; C08F 2800/20; B60C 1/0016; B60C 11/0008; B60C 2011/0025
USPC ........................................................ 524/521
See application file for complete search history.

(56) References Cited

U.S. PATENT DOCUMENTS

| | | | |
|---|---|---|---|
| 9,156,968 B2 | 10/2015 | Simon et al. | |
| 2013/0184397 A1* | 7/2013 | Blok ........................ | B60C 1/00 524/518 |

FOREIGN PATENT DOCUMENTS

| | | |
|---|---|---|
| WO | 2012/050657 A | 4/2012 |
| WO | 2012/050658 A | 4/2012 |
| WO | 2012/050667 A | 4/2012 |
| WO | 2015/084436 A | 6/2015 |
| WO | 2015/153055 A | 10/2015 |
| WO | 2015/153057 A | 10/2015 |
| WO | 2015/153058 A | 10/2015 |
| WO | 2015/153059 A | 10/2015 |
| WO | 2017/170839 | 5/2017 |

* cited by examiner

Primary Examiner — Angela C Scott

(57) ABSTRACT

This invention relates to a silane-functionalized resin composition having a polymer backbone, wherein the polymer backbone is selected from at least one of $C_5$ homopolymers and copolymer resins, terpene homopolymer or copolymer resins, pinene homopolymer or copolymer resins, $C_9$ homopolymers and copolymer resins, $C_5/C_9$ copolymer resins, alpha-methylstyrene homopolymer or copolymer resins, and combinations thereof, and wherein the polymer backbone is substantially free of styrene copolymer; and a silane, where the ratio of the mole percent of the silane to the mole percent of the polymer backbone in the composition is in the amount of 0.04 to 3.0 as determined by H-NMR.

20 Claims, No Drawings

FUNCTIONALIZED RESIN FOR TIRE APPLICATIONS

CROSS-REFERENCE TO RELATED APPLICATIONS

This present application is a National Stage Application of International Application No. PCT/US2017/021256, filed Mar. 8, 2017, which claims the benefit of and priority to U.S. Provisional Application No. 62/329,629, filed Apr. 29, 2016 and EP Application No. 16176535.9, filed Jun. 28, 2016, the disclosures of which are hereby incorporated by reference in their entireties.

FIELD OF THE INVENTION

This invention relates to functionalized hydrocarbon resins for use in tire applications.

BACKGROUND

Treads of high performance tires are expected to have outstanding traction and handling properties. Generally, tire treads are compounded with high filler loading and resins to achieve these desired properties.

For passenger tires, miscible resins are typically used in tread compound formulations in order to increase traction characteristics. Although these resins increase overall traction, tread compounds formulated with these miscible resins tend to suffer from reduced traction and handling at high speeds or at high internal tire temperatures generated during hard driving.

The problems observed in passenger tires at high speeds and temperatures have been solved by adding high softening point immiscible resins and resin blends to tread compounds for use in race car tires. For instance, it has been observed that using resin packages with high G' (storage modulus) values at high temperatures along with high tangent delta (ratio of loss modulus to storage modulus) values improve tire performance at high speeds and temperatures.

The use of functionalized resins in tire applications is known, for example WO2015/153058 discloses a free-radical process to prepare functionalized resins, WO2015/153055 discloses use of a hydrocarbon chain as a spacer group to prepare functionalized resins; WO2015/153059 discloses use of multiple functional groups to prepare functionalized resins; U.S. Pat. No. 9,156,968 discloses a rubber composition including a polystyrene polymer and a thermoplastic polymer where a functionalized silane component is incorporated into the already prepared thermoplastic polymer. However, all of these applications disclose processes to prepare functionalized resins following the polymerization of the resin and therefore the resulting resins do not contain a high amount of functionalized component. Accordingly, there remains a need for a functionalized resin composition that is usable for the formation of high performance tire treads which contains a highly-functionalized resin and that can be prepared in a cost effective manner.

SUMMARY OF THE INVENTION

This invention relates to a silane-functionalized resin composition, comprising a polymer backbone, wherein the polymer backbone is selected from at least one of $C_5$ homopolymers and copolymer resins, terpene homopolymer or copolymer resins, pinene homopolymer or copolymer resins, $C_9$ homopolymers and copolymer resins, $C_5/C_9$ copolymer resins, alpha-methylstyrene homopolymer or copolymer resins, and combinations thereof, and wherein the polymer backbone is substantially free of styrene copolymer; and a silane, wherein the ratio of the mole percent of the silane to the mole percent of the polymer backbone in the composition is in the amount of about 0.04 to about 3.0 as determined by H-NMR. This invention further relates to a tire tread composition comprising the aforementioned functionalized resin composition.

DETAILED DESCRIPTION

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

The inventors have discovered that preparing a silane-functionalized hydrocarbon resin by introducing a polymer backbone and a silane group simultaneously in a reactor results in higher functionalization of the resin, and therefore provides advantageous properties for the resin for use in elastomeric compounds of high performance tires.

The term "phr" means parts per hundred parts of rubber, and is a measure common in the art wherein components of a composition are measured relative to the total of all of the elastomer (rubber) components. The total phr or parts for all rubber components, whether one, two, three, or more different rubber components is present in a given recipe is always defined as 100 phr. All other non-rubber components are ratioed against the 100 parts of rubber and are expressed in phr.

The term "interpolymer" means any polymer or oligomer having a number average molecular weight of 500 or more prepared by the polymerization or oligomerization of at least two different monomers, including copolymers, terpolymers, tetrapolymers, etc. As used herein, reference to monomers in an interpolymer is understood to refer to the as-polymerized and/or as-derivatized units derived from that monomer. The terms polymer and interpolymer are used broadly herein and in the claims to encompass higher oligomers having a number average molecular weight (Mn) equal to or greater than 500, as well as compounds that meet the molecular weight requirements for polymers according to classic ASTM definitions.

All resin component percentages listed herein are weight percentages, unless otherwise noted. "Substantially free" of a particular component in reference to a composition is defined to mean that the particular component comprises less than 0.5 wt % in the composition, or more preferably less than 0.25 wt % of the component in the composition, or most preferably less than 0.1 wt % of the component in the composition.

The term "elastomer," as used herein, refers to any polymer or combination of polymers consistent with the ASTM D1566 definition, incorporated herein by reference. As used herein, the term "elastomer" may be used interchangeably with the term "rubber."

Functionalized Resin

The functionalized resin molecules of the present invention are prepared via cationic polymerization methods known in the art.

Polymer Backbone

The phrase "polymer backbone" includes units derived from, terpene homopolymer or copolymer resins, $C_5$ fraction homopolymer or copolymer resins, $C_9$ fraction homopolymer or copolymer resins. The polymer backbone may further include units derived from terpene/vinylaromatic copolymer resins, terpene/phenol copolymer resins, pinene/vinylaromatic copolymer resins, pinene/phenol copolymer resins, $C_5$ fraction/vinylaromatic copolymer resins, and combinations thereof. The term "resin molecule" or "resin" as used herein is interchangeable with the phrase "polymer backbone."

Preferably, the polymer backbone is substantially free of units derived from styrene.

Preferably, the polymer backbone contains non-aromatic components. The non-aromatic components of the polymer backbone include piperylene-based components. Piperylene components are generally a distillate cut or synthetic mixture of $C_5$ diolefins, which include, but are not limited to, cis-1,3-pentadiene, trans-1,3-pentadiene, and mixed 1,3-pentadiene. In general, piperylene components do not include branched $C_5$ diolefins such as isoprene. The piperylene component may be supplied in one embodiment as a mixed distillate cut or synthetic mixture comprising up to 20 wt % or up to 30 wt % of other components, such as, for example, 10-20 wt % cyclopentene, 10-20 wt % inert hydrocarbons, and optionally relatively minor amounts of one or more other olefins and diolefins such as 2-methylbutene-1, 2-methylbutene-2, pentene-1, pentene-2, 2-methylpentene-1, 4-methylpentene-1, 3-methylpentadiene-1,4, cyclopentadiene, hexene-1, hexene-2, hexene-3, methylcyclopentadiene, and the like. As used herein in reference to piperylene, aromatic, styrenic, amylene, cyclic pentadiene components, and the like, "inert hydrocarbons" are defined as saturated hydrocarbons or hydrocarbons which are otherwise essentially non-polymerizable in carbocationic polymerization systems, e.g., the inert compounds have a reactivity ratio relative to cyclopentadiene less than 0.01. As used herein, "minor amounts" of the other olefins and diolefins refer to less than 8 wt % of the individual olefin or diolefin, preferably less than 4 wt %, preferably less than 3 wt %, preferably less than 2 wt %, more preferably less than 1 wt %, more preferably less than 0.1 wt %, and more preferably less than 0.01 wt % by weight of the piperylene component.

In one embodiment, the polymer backbone is prepared from a monomer mix having from 20 to 95% piperylene components, or with a range of piperylene components from any lower limit selected from 20, 25, 30, 35, 40, 45, or 50% piperylene components up to any higher upper limit selected from 95, 85, 75, 65, 60, 55, 50, 45, 40, or 35% piperylene components, by weight of the total monomers in the monomer mixture.

Preferably, the polymer backbone has a refractive index greater than 1.5. Preferably, the polymer backbone has a softening point of 20° C. or more (Ring and Ball, as measured by ASTM E-28) more preferably from 20° C. to 150° C., most preferably 20° C. to 80° C.

Preferably, the polymer backbone has a glass transition temperature (Tg) (as measured by ASTM E 1356 using a TA Instruments model 2920 machine) of from −30° C. to 100° C.

Preferably, the polymer backbone has a number average molecular weight (Mn) greater than about 300 g/mole, or greater than about 600 g/mole, or greater than about 700 g/mole, or greater than about 800 g/mole, or greater than about 900, or greater than about 1000 g/mole. In an embodiment the polymer backbone has an Mn between about 300 g/mole and 2000 g/mole, or between about 800 g/mole and 1500 g/mole.

Preferably, the polymer backbone has a Brookfield Viscosity (ASTM D-3236) measured at the stated temperature (typically from 120° C. to 190° C.) using a Brookfield Thermosel viscometer and a number 27 spindle of 50 to 25,000 mPa·s at 177° C.

Preferably, the polymer backbone comprises olefinic unsaturation, e.g., at least 1 mol % olefinic hydrogen, based on the total moles of hydrogen in the interpolymer as determined by $^1$H-NMR. Alternatively, the polymer backbone comprises from 1 to 20 mol % aromatic hydrogen, preferably from 2 to 15 mol % aromatic hydrogen, more preferably from 2 to 10 mol % aromatic hydrogen, preferably at least 8 mol % aromatic hydrogen, based on the total moles of hydrogen in the polymer.

Mw, Mn, and Mz of the polymer backbone of the present invention and reported in Table 1 were determined by gel permeation chromatography (GPC) as follows. A Tosoh EcoSEC HLC-8320 GPC system equipped with enclosed Differential Refractive Index (RI) and Ultraviolet (UV) detectors was used with 3 separation columns in the following order: PLgel 5 μm Mixed-D, 300×7.5 mm, PLgel 5μ $10^3$ Å, 300×7 5 mm, PLgel 5μ 500 Å, 300×7.5 mm & PLgel 5μ 50 Å, 300×7.5 mm Tetrahydrofuran (THF) was used as an eluent at a flow rate of 1.0 mL/min at room temperature (range of about 20° C. to about 23.5° C.). The GPC samples are prepared by dissolving 24 mg (+/−0.2 mg) of each material in 9 mL of THF. 0.5 μL of Toluene was used as a flow marker. Mw and Mw/Mn data were calculated based on RI calibration with EcoSEC software, prepared using narrow Mw polystyrene standards.

The polymer backbone described above may be produced by methods generally known in the art for the production of polymer backbones, and the invention is not limited by the method of forming the polymer backbones. Preferably, the polymer backbone is produced by combining the feed stream in a polymerization reactor with a Friedel-Crafts or Lewis Acid catalyst at a temperature between 0° C. and 200° C. Friedel-Crafts polymerization is generally accomplished by use of known catalysts in a polymerization solvent, and the solvent and catalyst may be removed by washing and distillation. The polymerization process utilized for this invention may be batchwise or continuous mode. Continuous polymerization may be accomplished in a single stage or in multiple stages.

In an embodiment, the preparation method comprises: adjusting the proportions of components in the monomer feed mixture to control the properties of the polymer backbone, e.g., the softening point by adjusting the type or amount of aromatics component or the proportion of the piperylene component.

Examples of polymer backbones useful in this invention include Escorez® resins sold by ExxonMobil Chemical Company.

Silane

As used herein, the term "silane" means any silicon analog of a substituted or unsubstituted hydrocarbon. The term "silane structure" refers to any compound, moiety or group containing a tetravalent silicon atom. Preferably, the silane useful herein is represented by either of the following formula (I), (II), and/or (III):

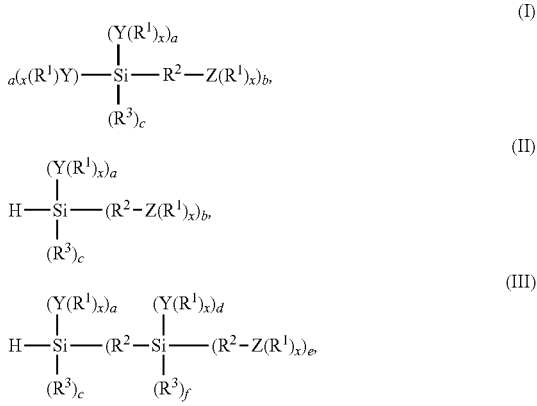

where each Y is independently a nitrogen, oxygen, or sulfur atom, each Z is independently a boron, nitrogen, oxygen, silicon or sulfur atom, each $R^1$ is independently a hydrogen atom, or a substituted or unsubstituted alkyl or aromatic or bicyclic group of from 1 to 20 carbon atoms, each $R^2$ is independently a divalent substituted or unsubstituted alkyl or aromatic group of from 2 to 20 carbon atoms, each $R^3$ is independently a hydrogen atom, a halogen atom, a sulfonate group, a substituted or unsubstituted alkyl or aromatic group of from 1 to 20 carbon atoms, $R^1$, $R^2$, and $R^3$ may form single or multinuclear rings with each other, a-f are independently integers of 1, 2, or 3, with the proviso that a+b+c and d+e+f are both equal to 3, and independently for each Y and Z, if Z is a boron atom, then x=2, if Y or Z is a nitrogen atom, then x=2, if Y or Z is an oxygen or sulfur atom, then x=1, if Z is a silicon atom, then x=3.

High Performance Tire Tread Compositions

The functionalized polymer produced by this invention can be used in a high performance tire tread composition.

The high performance tire tread composition is formed by blending the functionalized polymer produced by this invention with diene elastomer and inorganic filler. Preferably, the functionalized polymer is present within the range from 5 to 100 phr, more preferably 15 to 50 phr, most preferably 20 to 50 phr. The diene elastomer may comprise a blend of two or more elastomers. The individual elastomer components may be present in various conventional amounts, with the total diene elastomer content in the tire tread composition being expressed as 100 phr in the formulation. Preferably, the inorganic filler is present within the range from 50 to 150 phr, more preferably 50 to 100 phr, most preferably 60 to 90 phr.

Diene Elastomer

As used herein, the term "diene elastomer" is meant to refer to any viscoelastic polymer synthesized from hydrocarbon monomer comprising two carbon double bonds.

Examples of preferred diene elastomers include, but are not limited to, natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, butyl rubber, halogenated butyl rubber, branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof. Blends of these diene elastomers may be reactor blends and/or melt mixes. Particularly, preferred diene elastomers include polybutadiene rubber and styrene-butadiene rubber. Preferably, the styrene-butadiene rubber has a styrene content of 25 wt %. A preferred styrene-butadiene rubber is commercially available by Lanxess as Buna™ VSL 5025-2.

Inorganic Filler

The term "filler" as used herein refers to any material that is used to reinforce or modify physical properties, impart certain processing properties, or reduce cost of an elastomeric composition.

Examples of fillers suitable for the present invention include, but are not limited to, calcium carbonate, clay, mica, silica, silicates, talc, titanium dioxide, alumina, zinc oxide, starch, wood flour, carbon black, or mixtures thereof. The fillers may be any size and typically range, for example in the tire industry, from 0.0001 μm to 100 μm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

Coupling Agent

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be pre-mixed, or pre-reacted, with the silica particles or added to the rubber mix during the rubber/silica processing, or mixing, stage. If the coupling agent and silica are added separately to the rubber mix during the rubber/silica mixing, or processing stage, the coupling agent then combines in situ with the silica.

The coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur. Among these, preferred for a rubber composition for tires is the sulfur-based coupling agent.

In an embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. Silane polysulphides can be described by the formula UV):

in which x is an integer from 2 to 8 (preferably from 2 to 5); the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene); the Z symbols, which are identical or different, correspond to one of the three formulae (V):

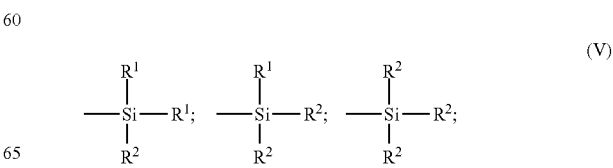

in which the $R^1$ radicals, which are substituted or unsubstituted and identical to or different from one another, represent a $C_1$-$C_{15}$ alkyl, $C_5$-$C_{15}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl); the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl), International Patent Application Nos. WO 03/002648 and WO 03/002649 further disclose silane polysulfides. Non-limiting examples of silane polysulphides include bis(($C_1$-$C_4$)alkoxy($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)poly sulphides. Further examples include bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Other examples include bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in International Patent Application No. WO 02/083782.

The coupling agent can also be bifunctional POSs (polyorganosiloxanes), or hydroxysilane polysulphides, as described in International Patent Application Nos. WO 02/30939, WO 02/31041 and WO 2007/061550, or silanes or POSs bearing azodicarbonyl functional groups, as described in International Patent Application Nos. WO 2006/125532, WO 2006/125533 and WO 2006/125534. The coupling agent can also include other silane sulphides, for example, silanes having at least one thiol (—SH) functional group (referred to mercaptosilanes) and/or at least one masked thiol functional group, as described in U.S. Pat. No. 6,849,754, and International Patent Application Nos. WO 99/09036, WO 2006/023815, WO 2007/098080, WO 2008/055986 and WO 2010/072685.

As used herein, the term "coupling agent" includes a blend of one or more coupling agents described herein. A preferred coupling agent for the present invention includes alkoxysilane or polysulphurized alkoxysilane. A particularly preferred polysulphurized alkoxysilane is bis(triethoxysilylpropyl) tetrasulphide, which is commercially available from Degussa under the trade name X50S.

Plasticizer

As used herein, the term "plasticizer" (also referred to as a processing oil), refers to a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils.

Antioxidant

As used herein, the term "antioxidant" refers to a chemical that combats oxidative degradation. Suitable antioxidants include diphenyl-p-phenylenediamine and those disclosed in *The Vanderbilt Rubber Handbook* (1978), Pages 344 to 346.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Processing

The inventive tire tread composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage, during which the vulcanization system is added. The terms "non-productive" and "productive" mix stages are well known to those having skill in the rubber mixing art. In the productive mix stage, the mixing typically occurs at a temperature, or ultimate temperature, lower than the mix temperature(s) of the preceding nonproductive mix stage(s).

EXAMPLE

Resins A-I of Table 1 were prepared by incorporating 95 wt % of piperylene with 5 wt % of a silane group in a lab-scale continuous stirred tank reactor at 10° C. with 0.2 wt % of $AlCl_3$-based Lewis acid catalyst. The number average and weight average molecular weight of the resins is reported in Table 1. A 1H NMR sepectroscopy analysis of the resins was conducted to show the degree of incorporation of the silane group to the polymer backbone. H-NMR analysis of Resin A indicated that no silane was incorporated into the polymer backbone. The inventors believe the use of tri-methoxy (4-vinylphenyl) silane and other similar silane functional components which do not have at least two carbon atoms space to the Si group do not allow for sufficient incorporation of the silane to the backbone. While piperylene is the only polymer backbone tested in the examples of the present invention, the invention is not limited to using piperylene. Similar incorporation of the silane component to the backbone is expected with other monomers, such as isoprene or amlyene, including mixtures thereof.

TABLE 1

| | A | B | C | D | E | F | G | H | I |
|---|---|---|---|---|---|---|---|---|---|
| Piperylene (wt %) | 95 | 95 | 95 | 95 | 95 | 95 | 95 | 35 | 20 |
| Tri-methoxy (4-vinylphenyl) silane (wt %) | 5 | | | | | | | | |
| Styrylethyl trimethoxysilane (wt %) | | 5 | | | | | | 65 | 80 |

TABLE 1-continued

|  | A | B | C | D | E | F | G | H | I |
|---|---|---|---|---|---|---|---|---|---|
| Allyltrimethyl Silane (wt %) |  |  | 5 |  |  |  |  |  |  |
| 2-Trimethylsilylloxy-1,3-butadiene (wt %) |  |  |  | 5 |  |  |  |  |  |
| 5-Bicylco(2,2,1)hept-2-enyl ethyltrimethoxy silane wt %) |  |  |  |  | 5 |  |  |  |  |
| 1,3-Divinyltetramethyl disiloxane (wt %) |  |  |  |  |  |  |  | 5 |  |
| Styrene (wt %) |  |  |  |  |  |  | 5 |  |  |
| Mn (g/mole) | 522 | 670 | 480 | 350 | 536 | 780 | 670 | 400 | 350 |
| Mw (g/mole) | 5790 | 10500 | 1370 | 1750 | 4600 | 4100 | 3108 | 7200 | 7600 |
| Ratio of Silane/Piperylene by H-NMR | N/A | 0.05 | 0.05 | 0.04 | 0.05 | 0.05 | 0 | 0.8 | 2.5 |

Resins B, G, H, and I were incorporated into a tread formulation for testing of tire properties. All ingredients of the tread formulation are reported in Table 2. All components, except for the stearic acid, Akro-Zinc Bar 85, 388 Super Fine Sulfur, N-cyclohexyl benzothiazole sulfonamide, and diphenyl guanidine, were introduced into a Banbury™ mixer at a temperature of 120° C. The rpm of the mixer was increased until the temperature of the batch reached 150° C. The temperature was maintained at 150° C. for four minutes. The resultant batch mixture was recovered and cooled. The recovered mixture was mixed a second time in the Banbury™ mixer at 120° C. The rpm of the mixer was increased until the temperature of batch reached 150° C. The temperature was maintained at 150° C. for 1 minute. The resultant batch mixture was recovered and cooled. Stearic acid, Akro-Zinc Bar 85, 388 Super Fine Sulfur, N-cyclohexyl benzothiazole sulfonamide, and diphenyl guanidine were added to the Banbury™, along with the batch mixture at a temperature of 70° C. The temperature was maintained at 70° C. for 7 minutes.

TABLE 2

|  | Tread 1 with 20 phr Resin B | Tread 2 with 20 phr Resin G | Tread 3 with 20 phr Resin H | Tread 4 with 20 phr Resin I |
|---|---|---|---|---|
| NS116R (styrene-butadiene rubber with 21 wt % styrene and 55 wt % vinyl) | 58.5 | 58.5 | 58.5 | 58.5 |
| CB 24 (cis-polybutadiene) | 31.5 | 31.5 | 31.5 | 31.5 |
| Natural Rubber | 10 | 10 | 10 | 10 |
| Z1165 (silica) | 67 | 67 | 67 | 67 |
| 6PPD ((1,3-dimethylbutyl) | 2 | 2 | 2 | 2 |
| X50S, coupling agent (50 wt % Si-69 (bis (3-triethoxylsilylpropyl) tetrasulfide) and 50 wt % N330 carbon black) | 7 | 7 | 7 | 7 |
| Stearic Acid | 2.5 | 2.5 | 2.5 | 2.5 |
| Akro-Zinc Bar 85 | 2.0 | 2.0 | 2.0 | 2.0 |
| 388 Super Fine Sulfur | 1.4 | 1.4 | 1.4 | 1.4 |
| N-Cyclohexyl benzothiazole sulfonamide | 1.2 | 1.2 | 1.2 | 1.2 |
| Diphenyl guanidine | 1.4 | 1.4 | 1.4 | 1.4 |

The resultant mixture was recovered, cooled and pressured into plaques. The plaques were compression molded and cured at 160° C. for testing of cure properties and dynamic mechanical properties, as reported in Table 3. While only Resins B, G, H, and I were formulated into treads and tested, it is expected that the silane components of Resins C—F are likewise suitable for use in the present invention.

Cure properties were measured using MDR 2000 from Alpha Technologies, Inc. at 160° C. based on ASTM D-2084 at 1.667 Hz and 14% strain. "MH" and "ML" used herein refer to "maximum torque" and "minimum torque," respectively.

Dynamic mechanic properties were measure via dynamic mechanical analysis (DMA) at 100° C., 14% strain, and 5 Hz in accordance with ASTM D7605. Tan delta (ratio of loss modulus to storage modulus) can be used as an indicator of tire grip and other enhanced performance characteristics under extreme use conditions. Storage modulus (G') and tan delta were measured at 31° C., 61° C., and 121° C. Tire tread compositions formed from the silica-treated functionalized resins of the present invention exhibit superior dynamic mechanical properties measured, indicating improved durability, traction, and handling.

TABLE 3

|  | Tread 1 with Resin B | Tread 2 with Resin G | Tread 3 with Resin H | Tread 4 with Resin I |
|---|---|---|---|---|
| ML (dNm) | 7.08 | 5.93 | 9.39 | 10.78 |
| MH (dNm) | 28.56 | 29.94 | 56.04 | 62.3 |
| Tan Delta at 31° C. | 0.249 | 0.196 | 0.191 | 0.182 |
| Tan Delta at 61° C. | 0.212 | 0.154 | 0.145 | 0.142 |
| Tan Delta at 121° C. | 0.140 | 0.100 | 0.082 | 0.087 |
| G' at 31° C. (kPa) | 8,707 | 6,166 | 14,583 | 15,990 |
| G' at 61° C. (kPa) | 6,544 | 5,172 | 11,417 | 12,615 |
| G' at 121° C. (kPa) | 4,690 | 4,770 | 9,491 | 10,528 |

Dynamic mechanic properties were measured via dynamic mechanical analysis (DMA) at 100° C., 14% strain, and 5 Hz in accordance with ASTM D7605. Tan delta (ratio of loss modulus to storage modulus) can be used as an indicator of tire grip and other enhanced performance characteristics under extreme use conditions. Storage modulus (G') and tan delta were measured at 31° C., 61° C., and 121° C. Tire tread compositions formed from the silica-treated functionalized resins of the present invention exhibit superior dynamic mechanical properties measured, indicating improved durability, traction, and handling.

Tread 2, with 20 phr of Resin G, is a comparative example as Resin G contains no silane group, but only a non-functionalized hydrocarbon (i.e., styrene). Treads 1, 3, and 4 have comparable tan delta values to Tread 2 (comparative) indicating that all treads have similar tire grip and performance—such as traction—at extreme conditions. Treads 1, 3, and 4 have significantly improved higher G' values than Tread 2 (comparative), indicating improved durability and handling, without compromising traction.

Functionalized resins, prepared in an in-situ process, such as those of the invention, display higher functionalization (as measured by the mole percent ratio of the silane to polymer backbone), in the order of about 0.04 to about 3.0, preferably about 0.5 to about 3.0, as compared to functionalized resins prepared after the polymerization of the resins, generally having a mole percent ratio of the silane to polymer backbone in the order of about 0.05 to about 0.4.

The examples of the invention indicate that a one-step process for functionalized hydrocarbon resins by cationic polymerization of piperylene with a silane component allows for the formation of a stable, immiscible resin system useful for high performance tire treads.

INDUSTRIAL APPLICABILITY

The compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the compositions comprising the resin are useful in a variety of tire applications such as truck tires, bus tires, automobile tires, motorcycle tires, off-road tires, aircraft tires, and the like. Such tires can be built, shaped, molded, and cured by various methods which are known and will be readily apparent to those having skill in the art. The compositions may be fabricated into a component of a finished article for a tire. The component may be any tire component such as treads, sidewalls, chafer strips, tie gum layers, reinforcing cord coating materials, cushion layers, and the like.

The compositions comprising the resin of the present invention are useful in a variety of applications, such as tire curing bladders, inner tubes, air sleeves, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and various bladders for fluid retention and curing processes. They are also useful as plasticizers in rubber formulations; as components to compositions that are manufactured into stretch-wrap films as dispersants for lubricants; and in potting and electrical cable filling and cable housing materials.

The compositions comprising the resin may also be useful in molded rubber parts and may find wide applications in automobile suspension bumpers, auto exhaust hangers, and body mounts.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

The invention claimed is:

1. A silane-functionalized resin composition, comprising:
   (a) a polymer backbone;
   wherein the polymer backbone is selected from at least one of $C_5$ homopolymers, $C_5/C_9$ copolymer resins, and combinations thereof, and wherein the polymer backbone is substantially free of aromatic components, and wherein the polymer backbone comprises within the range from 20 to 100 wt % of components derived from piperylene; and
   (b) a silane;
   wherein the silane is of the formula (I):

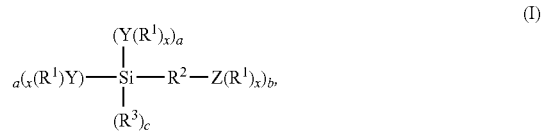

wherein each Y is independently an oxygen or sulfur atom, Z is an oxygen, silicon, or sulfur atom, each $R^1$ is independently a hydrogen atom, or a substituted or unsubstituted alkyl or aromatic or bicylic group of from 1 to 20 carbon atoms, $R^2$ is a divalent substituted or unsubstituted alkyl or aromatic group of from 2 to 20 carbon atoms, $R^3$ is a hydrogen atom, a halogen atom, a substituted or unsubstituted alkyl or aromatic group of from 1 to 20 carbon atoms, $R^1$, $R^2$, and $R^3$ may form single or multinuclear rings with each other, a, b, and c are each equal to 1, and independently for each Y and Z, if Y or Z is an oxygen or sulfur atom, then x=1, if Z is a silicon atom, then x=3, or the silane is selected from the group consisting of tri-methoxy (4-vinylphenyl) silane, styrylethyl trimethoxysilane, allyltrimethyl silane, 2-trimethylsilylloxy-1,3-butadiene, 5-bicylco(2,2,1)hept-2-enyl ethyltrimethoxy silane, and 1,3-divinyltetramethyl disiloxane; and
wherein the ratio of the mole percent of the silane to the mole percent of the polymer backbone in the composition is 0.04 to 3.0, as determined by H-NMR.

2. The composition of claim 1, wherein the ratio of the mole percent of the silane to the mole percent of the polymer backbone in the composition is in the amount of 0.5 to 3.0 as determined by H-NMR.

3. The composition of claim 1 comprising:
   (i) less than or equal to 15 wt % of components derived from amylene; and (ii) less than or equal to 15 wt % of components derived from isoprene.

4. The composition of claim 1, wherein the silane is selected from the group consisting of tri-methoxy (4-vinylphenyl) silane, styrylethyl trimethoxysilane, allyltrimethyl silane, 2-trimethylsilylloxy-1,3-butadiene, 5-bicylco(2,2,1)hept-2-enyl ethyltrimethoxy silane, and 1,3-divinyltetramethyl disiloxane.

5. The composition of claim 1, wherein the silane comprises styrylethyl trimethoxysilane.

6. A silane-functionalized resin composition, comprising
(a) a polymer backbone;
wherein the polymer backbone is selected from at least one of $C_5$ homopolymers, $C_5/C_9$ copolymer resins, and combinations thereof, and wherein the polymer backbone is substantially free of aromatic components, and where the polymer backbone comprises within the range from 20 to 100 wt % of components derived from piperylene; and
(b) a silane;
wherein the silane is selected from the group consisting of styrylethyl trimethoxysilane, allyltrimethyl silane, 2-trimethylsilylloxy-1,3-butadiene, 5-bicylco(2,2,1) hept-2-enyl ethyltrimethoxy silane, and 1,3-divinyltetramethyl disiloxane;
and
wherein the ratio of the mole percent of the silane to the mole percent of the polymer backbone in the composition is 0.04 to 3.0, as determined by H-NMR.

7. The composition of claim 6, wherein the silane comprises styrylethyl trimethoxysilane, and wherein the ratio of the mole percent of the silane to the mole percent of the polymer backbone in the composition is 0.5 to 3.0, as determined by H-NMR.

8. A tire tread composition comprising:
(i) the composition of claim 1, within the range from 5 to 100 phr;
(ii) 100 phr of a diene elastomer; and
(iii) an inorganic filler within the range from 50 to 150 phr.

9. The tire tread composition of claim 8, wherein the inorganic filler comprises silica.

10. The tire tread composition of claim 8, wherein the diene elastomer is selected from the group consisting of natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, butyl rubber, halogenated butyl rubber, branched butyl rubber, halogenated star-branched butyl rubber, poly(isobutylene-co-p-methylstyrene), brominated butyl rubber, chlorinated butyl rubber, star-branched polyisobutylene rubber, and mixtures thereof.

11. The tire tread composition of claim 8, wherein the diene elastomer comprises a mixture of polybutadiene rubber and styrene-butadiene rubber.

12. The tire tread composition of claim 8, further comprising a coupling agent.

13. The tire tread composition of claim 8, wherein the composition is cured.

14. A tire tread composition comprising:
(i) the composition of claim 6, within the range from 5 to 100 phr;
(ii) 100 phr of a diene elastomer; and
(iii) an inorganic filler within the range from 50 to 150 phr.

15. The tire tread composition of claim 14, further comprising a coupling agent wherein:
the inorganic filler comprises silica,
the diene elastomer is selected from the group consisting of natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, butyl rubber, halogenated butyl rubber, branched butyl rubber, halogenated star-branched butyl rubber, poly(isobutylene-co-p-methylstyrene), brominated butyl rubber, chlorinated butyl rubber, star-branched polyisobutylene rubber, and mixtures thereof, and
the composition is cured.

16. A tire comprising the tire tread composition of claim 8.

17. A tire comprising the tire tread composition of claim 15.

18. A method of making a silane-functionalized resin composition, comprising the steps of:
(a) combining a polymer backbone and a silane, wherein the polymer backbone is selected from at least one of $C_5$ homopolymers, $C_5/C_9$ copolymer resins, and combinations thereof, wherein the polymer backbone is substantially free of aromatic components, and wherein the polymer backbone comprises within the range from 20 to 100 wt % of components derived from piperylene, wherein the silane is of the formula (I):

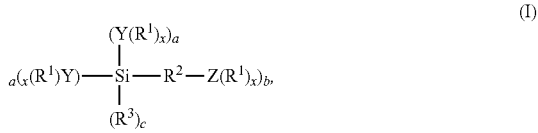

wherein each Y is independently an oxygen, or sulfur atom, Z is an oxygen, silicon or sulfur atom, each $R^1$ is independently a hydrogen atom, or a substituted or unsubstituted alkyl or aromatic or bicylic group of from 1 to 20 carbon atoms, $R^2$ is a divalent substituted or unsubstituted alkyl or aromatic group of from 2 to 20 carbon atoms, $R^3$ is a hydrogen atom, a halogen atom, a substituted or unsubstituted alkyl or aromatic group of from 1 to 20 carbon atoms, $R^1$, $R^2$, and $R^3$ may form single or multinuclear rings with each other, a, b, and c are each equal to 1, and independently for each Y and Z, if Y or Z is an oxygen or sulfur atom, then x=1, if Z is a silicon atom, then x=3, or the silane is selected from the group consisting of tri-methoxy (4-vinylphenyl) silane, styrylethyl trimethoxysilane, allyltrimethyl silane, 2-trimethylsilylloxy-1,3-butadiene, 5-bicylco(2,2,1)hept-2-enyl ethyltrimethoxy silane, and 1,3-divinyltetramethyl disiloxane;
and
(b) recovering a silane-functionalized resin composition;
wherein the ratio of the mole percent of the silane to the mole percent of the polymer backbone in the composition is in the amount of 0.04 to 3.0 as determined by H-NMR.

19. The method of claim 18, wherein the ratio of the mole percent of the silane to the mole percent of the polymer backbone in the composition is in the amount of 0.5 to 3.0 as determined by H-NMR.

20. The method of claim 18, wherein the silane is selected from the group consisting of tri-methoxy (4-vinylphenyl) silane, styrylethyl trimethoxysilane, allyltrimethyl silane, 2-trimethylsilylloxy-1,3-butadiene, 5-bicylco(2,2,1)hept-2-enyl ethyltrimethoxy silane, and 1,3-divinyltetramethyl disiloxane.

\* \* \* \* \*